US008639929B2

(12) United States Patent
Bian et al.

(10) Patent No.: US 8,639,929 B2
(45) Date of Patent: Jan. 28, 2014

(54) METHOD, DEVICE AND SYSTEM FOR AUTHENTICATING GATEWAY, NODE AND SERVER

(71) Applicant: Huawei Technologies Co., Ltd., Guangdong (CN)

(72) Inventors: Yonggang Bian, Shenzhen (CN); Lunjian Mu, Shenzhen (CN); Jue Wang, Shenzhen (CN); Yongjing Zhang, Shenzhen (CN); Cheng Huang, Shenzhen (CN); Chuansuo Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/729,576

(22) Filed: Dec. 28, 2012

(65) Prior Publication Data

US 2013/0151852 A1    Jun. 13, 2013

Related U.S. Application Data

(63) Continuation of application No. PCT/CN2011/073427, filed on Apr. 28, 2011.

(30) Foreign Application Priority Data

Jun. 30, 2010   (CN) .......................... 2010 1 0219330

(51) Int. Cl.
  *H04L 9/32*   (2006.01)
  *H04L 9/00*   (2006.01)
  *H04L 29/06*  (2006.01)
  *G06F 15/16*  (2006.01)

(52) U.S. Cl.
  USPC ............... 713/168; 713/150; 713/169; 726/2; 709/227; 380/259

(58) Field of Classification Search
  USPC ........... 380/259; 709/227; 713/150, 168–169; 726/2
  See application file for complete search history.

(56) References Cited

U.S. PATENT DOCUMENTS

2004/0139201 A1   7/2004  Chaudhary et al.
2004/0172531 A1*  9/2004  Little et al. .................... 713/155
(Continued)

FOREIGN PATENT DOCUMENTS

CN   101388770 A   3/2009
CN   101399603 A   4/2009
(Continued)

OTHER PUBLICATIONS

Written Opinion of the International Searching Authority in corresponding PCT Patent Application No. PCT/CN2011/073427 (Aug. 4, 2011).

(Continued)

*Primary Examiner* — Beemnet Dada
*Assistant Examiner* — Kalish Bell
(74) *Attorney, Agent, or Firm* — Leydig, Voit & Mayer, Ltd.

(57) ABSTRACT

A method, device and system for authenticating gateway, node and server are provided in this invention. The node receives a message sent by a gateway, wherein the message comprises a number T3 shared by the gateway and a server, and a gateway identification. The node encrypts data with a key K1 shared by the node and the server, the data including T3, the gateway identification, and a random number T1 generated by the node, and then sends the encrypted data and a node identification to the server through the gateway. The node decrypts data encrypted by the server and forwarded by the gateway with the key, determines that the server is a valid server according to a T1-related number obtained by decryption, and establishes a security channel with the gateway according to a new key obtained through the decryption.

7 Claims, 4 Drawing Sheets

(56) References Cited

U.S. PATENT DOCUMENTS

| | | | |
|---|---|---|---|
| 2006/0075234 A1* | 4/2006 | You et al. | 713/169 |
| 2006/0184789 A1* | 8/2006 | Karasawa et al. | 713/160 |
| 2006/0212928 A1 | 9/2006 | Maino et al. | |
| 2007/0067625 A1* | 3/2007 | Jiang et al. | 713/168 |
| 2008/0263647 A1 | 10/2008 | Barnett et al. | |
| 2009/0158397 A1* | 6/2009 | Herzog et al. | 726/4 |
| 2009/0191857 A1 | 7/2009 | Horn et al. | |

FOREIGN PATENT DOCUMENTS

| | | |
|---|---|---|
| CN | 101420303 A | 4/2009 |
| CN | 101588579 A | 11/2009 |
| CN | 101741555 A | 6/2010 |
| WO | WO 2009/019298 A1 * | 2/2009 |

OTHER PUBLICATIONS

International Search Report in corresponding PCT Patent Application No. PCT/CN2011/073427 (Aug. 4, 2011).

Chinese Search Report in corresponding Chinese Patent Application No. 2010102193301 (Jan. 15, 2013).

Extended European Search Report in corresponding European Patent Application No. 11780145.6 (Oct. 10, 2013).

"3GPP TR 33.812—$3^{rd}$ Generation Partnership Project; Technical Specification Group Services and System Aspects; Feasibility study on the security aspects of remote provisioning and change of subscription for Machine to Machine (M2M) equipment (Release 9)," Jun. 2010, Version 9.2.0, $3^{rd}$ Generation Partnership Project, Valbonne, France.

* cited by examiner

US 8,639,929 B2

METHOD, DEVICE AND SYSTEM FOR AUTHENTICATING GATEWAY, NODE AND SERVER

CROSS-REFERENCE TO RELATED APPLICATIONS

This application is a continuation of International Patent Application No. PCT/CN2011/073427, filed on Apr. 28, 2011, which claims priority to Chinese Patent Application No. 201010219330.1, filed on Jun. 30, 2010, both of which are hereby incorporated by reference in their entireties.

FIELD OF THE INVENTION

The present invention relates to the field of communication techniques, and more specifically, to a method, device and system for gateway, node and server authentication.

BACKGROUND OF THE INVENTION

M2M is the abbreviation of Machine-to-Machine communication, which, in a limited sense, refers to communications between machines through short range communication techniques, such as Zigbee. To put it simply, M2M brings machines all over the world into a communication network to make all machines intelligent, and no longer senseless. Generalized M2M further comprises human-to-machine and machine-to-human communications.

M2M applications have gained a rapid growth in the vertical industry market including: intelligent home, security monitoring, electronic medical treatment, retail trade, logistics monitoring, and etc. Due to the lack of unified M2M standards, M2M applications in vertical industries are commonly end-to-end solutions provided by individual manufactures, resulting in strong coupling of terminals and applications and higher deployment cost; furthermore, a large amount of deployed vertical industries form individual information isolated islands, for which information sharing is difficult, and duplication of construction is liable to occur. All of these limit the further promotion of vertical M2M applications. Hence, it is desirable to construct a M2M horizontal platform, in which the type of communication to machines is transparent to applications, and machines are connected to applications through standard interfaces. With such a platform, information sharing can be realized, while M2M deployment cost can be reduced, which can further push the wide usage of M2M.

When a node joins a wireless sensor network, it is necessary for the node and a gateway to authenticate each other. Currently, a common method is that the node and the gateway to authenticate each other via third party services. In M2M applications, personal devices can act as gateways, which have a risk of being hacked and controlled by hackers. Whereas, in the prior art, gateways controlled by hackers can forge node login to disturb normal node operations, such as configuration parameter distribution failure, failing to acquire device data timely, unable to issue control commands in time, and etc, which may cause serious consequences. Also, nodes do not authenticate gateways in the prior art, and therefore it is impossible for the node to apply corresponding security strategies according to a gateway identification, for example, whether to enable separate encryption of application data, or whether to enable integrity verification.

SUMMARY OF THE INVENTION

A method for authenticating gateway, node and server is provided in embodiments of this invention, comprising receiving a request message from a gateway by a node, the message comprising a number $T3$ shared by the gateway and a server, and a gateway identification; encrypting by the node with a key $K1$ shared by the node and the server, the data including $T3$, the gateway identification, and a random number $T1$ generated by the node, and then sending the encrypted data and a node identification to the server through the gateway; decrypting data, by the node with the key, the data is encrypted by the server and forwarded by the gateway, determining that the server is a valid server according to a $T1$-related number obtained by decryption, and establishing a security channel with the gateway according to a new key obtained through the decryption.

A method for authenticating gateway, node and server, comprises: receiving, by a server, data encrypted by a node and a node identification which are forwarded through a gateway; determining, by the server, a key shared by the node and the server according to the node identification, and decrypting the data encrypted by the node with the key; determining, by the server, that the node is a valid node according to a number $T3$ shared by the server and the gateway, and a gateway identification obtained through the decryption; and generating a new key; encrypting, by the server, the new key and a $T1$-related number with the key shared by the node and the server, and sending the encrypted data to the node through the gateway.

A node, comprising: a receiving unit for receiving a request message sent by a gateway, the message comprising a number $T3$ shared by the gateway and a server, and a gateway identification; an encrypting and sending unit for encrypting data with a key $K1$ shared by the node and the server, the data including $T3$, the gateway identification, and a random number $T1$ generated by the node, and then sending the encrypted data and a node identification to the server through the gateway; a decrypting unit for decrypting data encrypted by the server and forwarded by the gateway with the key, determining that the server is a valid server according to a $T1$-related number obtained by decryption, and establishing a security channel with the gateway according to a new key obtained through the decryption.

A server comprises: a receiving unit, for receiving data encrypted by a node and a node identification which are forwarded through a gateway; a decrypting unit for determining a key shared by the node and the server according to the node identification, and decrypting the data encrypted by the node with the key; a determining and generating unit for determining that the node is a valid node according to a number $T3$ shared by the server and the gateway, and a gateway identification obtained through the decryption; and generating a new key; an encrypting and sending unit for encrypting the new key and a $T1$-related number with the key shared by the node and the server, and sending the encrypted data to the node through the gateway.

A system for authenticating gateway, node and server comprises: a node for receiving a request message sent by a gateway, the message comprising a number $T3$ shared by the gateway and a server, and a gateway identification; encrypting data with a key $K1$ shared by the node and the server, the data including $T3$, the gateway identification, and a random number $T1$ generated by the node, and then sending the encrypted data and a node identification to the server through the gateway; decrypting data encrypted by the server and forwarded through the gateway with the key, determining that the server is a valid server according to a $T1$-related number obtained by decryption, and establishing a security channel with the gateway according to a new key obtained through the decryption; a server, for receiving data encrypted by the node and the node identification which are forwarded through the gateway; determining the key shared by the node and the server according to the node identification, and decrypting the data encrypted by the node with the key; determining that the node is a valid node according to a number T3 shared by the server and the gateway, and the gateway identification obtained through the decryption; and generating a new key; encrypting the new key and T1+1 with the key shared by the node and the server, and sending the encrypted data to the node through the gateway; a gateway for sending the message to the node, the message comprising the number T3 shared by the gateway and the server and the gateway identification, receiving and forwarding encrypted data sent by the node, and receiving and forwarding data encrypted by the server.

A node is employed in an embodiment of this invention to receive information sent by a gateway, wherein the information comprises a number T3 shared by the gateway and a server, and a gateway identification. The server can acquire information that can only be generated by the terminal node to authenticate the node. The node encrypts data to be encrypted, including T3, the gateway identification, and a random number T1 generated by the node, with a key shared by the node and the server, and then sends the encrypted data and a node identification to the server through the gateway. The node decrypts data encrypted by the server and forwarded by the gateway with the key, determines that the server is a valid server according to a T1-related number obtained by decryption, and establishes a security channel with the gateway according to a new key obtained through the decryption. By doing so, without increasing the times of information interaction between the gateway and the server, the server can authenticate the node during mutual authentication of the gateway and the node, thereby lowering security destructive power even if the gateway would be hacked and controlled by hackers, and improving security.

BRIEF DESCRIPTION OF THE DRAWINGS

For a more explicit description of the technical solutions of embodiments of this invention or the prior art, a brief introduction of accompanying drawings to be used in the description of these embodiments will be given below. Obviously, the accompanying drawings described below are merely some embodiments of this invention, and for those skilled in the art, other accompanying drawings can be derived from these ones without any creative efforts.

DETAILED DESCRIPTION OF THE EMBODIMENTS

Embodiment 1

Figure 1:
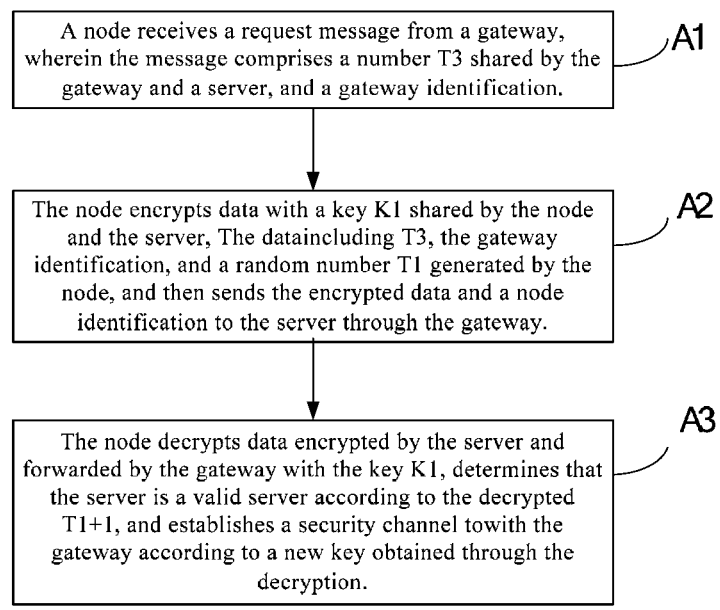
FIG. 1 is a flowchart of a method for gateway, node and server according to an embodiment of this invention.

Referring to FIG. 1, a method for authenticating gateway, node and server according to embodiment 1 of this invention comprises the following steps:

A1. A node receives a request message from a gateway, wherein the message comprises a number T3 shared by the gateway and a server, and a gateway identification.

The gateway establishes a security session with the server and shares the number T3 with the server. The T3 is randomly generated by the server during the establishment of the security session, and is increased by one at each interaction between the gateway and the platform; the gateway sends the message to the node to request its node information, wherein the message carries the number T3 shared by the gateway and the platform, and an identification ID2 of the gateway.

A2. The node encrypts data with a key K1 shared by the node and the server, the data including T3, the gateway identification, and a random number T1 generated by the node; and sends the encrypted data and a node identification to the server through the gateway.

The node encrypts the following information with the key K1 shared with the server: T3, ID2 and the random number T1 generated by the node; the node sends the encrypted information to the gateway along with the node identification ID1; if the node has applied a security strategy according to ID2, by which it is determined that application data needs end-to-end confidentiality and/or integrity protection, an indication of requiring end-to-end confidentiality and/or integrity protection can be added in the encrypted information. The gateway sends to the server a request for the node to join the network, wherein the encrypted information and the node identification ID1 sent by the node is carried on the request.

A3. The node decrypts data encrypted by the server and forwarded by the gateway with the key K1, determines that the server is a valid server according to a T1-related number obtained by decryption, and establishes a security channel with the gateway according to a new key obtained through the decryption.

The node decrypts the received encrypted information with K1 to get the T1-related number. Herein, the T1-related number is a number depending on T1, such as T1+1; and according to an agreement between the node and the server, after obtaining T1+1, the node can determine that the server is a valid server, and get a key K2 generated by the server. Then, the node and the gateway can use K2 to establish a security channel for information interaction.

In Embodiment 1, used a node receives information sent by a gateway, wherein the information comprises a number T3 shared by the gateway and a server, and a gateway identification. The server can acquire information that can only be generated by the terminal node to authenticate the node. The node encrypts data to be encrypted, including T3, the gateway identification, and a random number T1 generated by the node, with a key shared by the node and the server, and then sends the encrypted data and a node identification to the server through the gateway. The node decrypts data encrypted by the server and forwarded by the gateway with the key, determines that the server is a valid server according to T1-related number obtained by decryption, and establishes a security channel with the gateway according to a new key obtained by the decryption. By doing so, without increasing the times of information interaction between the gateway and the server, the server can authenticate the node during mutual authentication of the gateway and the node, thereby lowering security destructive power even if the gateway would be hacked and controlled by hackers, and improving security.

Embodiment 2

Figure 2:
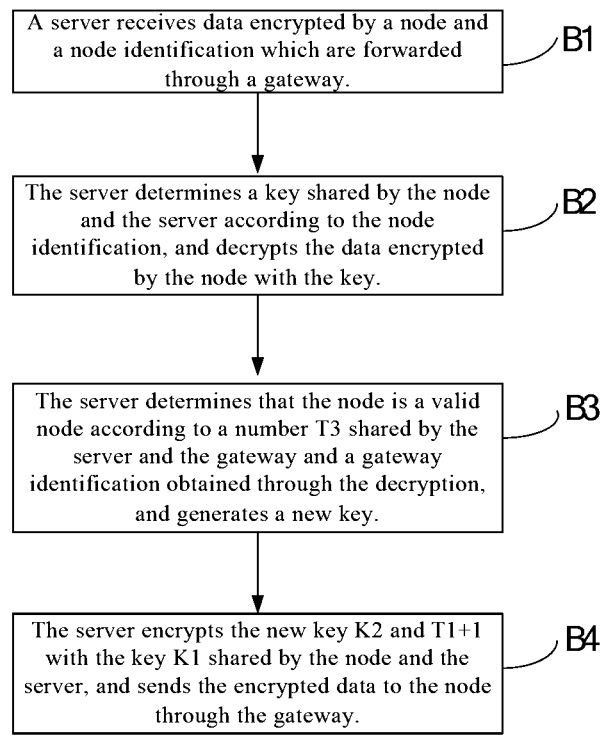
FIG. 2 is a flowchart of a method for authenticating gateway, node and server authentication according to an embodiment of this invention.

Referring to FIG. 2, a method for authenticating gateway, node and server is provided in embodiment 2 of this invention, comprising the following steps:

B1. A server receives data encrypted by a node and a node identification which are forwarded by a gateway.

The server receives the request for the node to join the network, sent by the gateway, and acquires the node identification ID1 and data encrypted by the node from the request.

B2. The server determines a key shared by the node and the server according to the node identification, and decrypts the data encrypted by the node with the key.

The server retrieves a key K1 shared by the server and the node according to ID1, and uses K1 to decrypt the data encrypted by the node.

B3. The server determines that the node is a valid node according to a number T3 shared by the server and the gateway, and a gateway identification obtained through the decryption; because T3 is originated from the server, and the encryption key is only possessed by a valid node, it is impossible for invalid entities to generate authentic encrypted data, and the validity of the node can be determined using T3 and the gateway identification obtained through further decryption, and a new key K2 is generated.

The server determines whether a authentic gateway identification ID2 and the number T3 shared by the server and the gateway can be obtained from the decrypted data; if so, a random number T1 generated by the node is obtained from the decrypted data and the key K2 is generated. Because T3 is originated from the server, and the encryption key is only possessed by a valid node, it is impossible for invalid entities to generate authentic encrypted data. If it is indicated by the decrypted data that end-to-end confidentiality and/or integrity protection is required, a random number T2 generated by the platform will be contained in the content to be encrypted, so that the node can generate a key required by security and/or integrity protection according to T2, or the platform determines that end-to-end confidentiality and/or integrity protection is required through a security strategy check, and then T2 and an indication of requiring end-to-end confidentiality and/or integrity protection will be contained in the content to be encrypted, so that the node can generate a key required by end-to-end confidentiality and/or integrity protection according to T2.

B4. The server encrypts the new key K2 and a T1-related number with the key K1 shared by the node and the server, and sends the encrypted data to the node through the gateway.

The server returns an acknowledgment representing that the node can join the network, wherein the data and K2 encrypted by the server are contained in the acknowledgment.

In Embodiment 2, the server receives data encrypted by a node and a node identification which are forwarded through a gateway. The server determines a key shared by the node and the server according to the node identification, and decrypts the data encrypted by the node with the key. The server determines that the node is a valid node according to a number T3 shared by the server and the gateway and a gateway identification obtained through the decryption, and generates a new key K2. The server encrypts the new key and a T1-related number with the key K1 shared by the node and the server, and sends the encrypted data to the node through the gateway. By doing so, without increasing the times of information interaction between the gateway and the server, the server can authenticate the node during mutual authentication of the gateway and the node, thereby lowering security destructive power even if the gateway would be hacked and controlled by hackers, and improving security.

Embodiment 3

Figure 3:
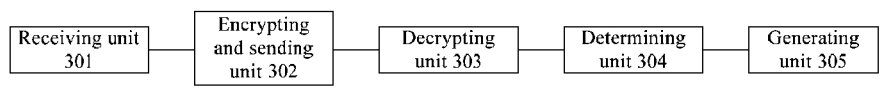
FIG. 3 is a basic block view of a node according to an embodiment of this invention.

Referring to FIG. 3, a node is provided in an embodiment of this invention, comprising:

a receiving unit 301 for receiving information sent by a gateway, wherein the information comprises a number T3 shared by the gateway and a server, and a gateway identification; T3 is randomly generated by the server during establishment of a security session and is increased by one at each interaction between the platform and the gateway; the gateway sends a message, which carries the number T3 shared by the gateway and the platform and a gateway identification ID2, to the node to request its node information;

an encrypting and sending unit 302 for encrypting data with a key shared by the node and the server, the data including T3, the gateway identification, and a random number T1 generated by the node; and sending the encrypted data and a node identification to the server through the gateway; the node encrypts the following information with a key k1 shared by the node and the server: T3, ID2, and a random number T1 generated by the node; the node sends the encrypted information to the gateway along with the node identification ID1;

a decrypting unit 303 for decrypting data encrypted by the server and forwarded by the gateway with the key, determining that the server is a valid server according to a T1-related number obtained by decryption, such as T1+1, and establishing a security channel with the gateway according to a new key obtained through the decryption; the node decrypts the received encrypted information with K1, verifies the validity of the information with the T1-related number, and acquires a key K2 generated by the server; then the node and the gateway can establish a security channel with K2 for information interaction.

The node further comprises a determining unit 304 for determining whether end-to-end confidentiality and/or integrity protection is needed to be enabled according to the gateway identification. If the node has applied a security strategy according to ID2, it is determined whether application data needs end-to-end confidentiality and/or integrity protection, and an indication of requiring end-to-end confidentiality and/or integrity protection can be added in the encrypted information. The gateway sends to the server a request for the node to join the network, which carries the encrypted information and the node identification ID1 sent to the gateway by the node.

The node further comprises a generating unit 305 for generating a key required by end-to-end confidentiality and/or integrity protection according to T2 generated by the server and obtained through the decryption; the T2 herein is the T2 at step B3 of embodiment 2.

Embodiment 3 employs the receiving unit 301 to receive information sent by the gateway, wherein the information comprises a number T3 shared by the gateway and a server, and a gateway identification. The encrypting and sending unit 302 encrypts data to be encrypted, including T3, the gateway identification, and the random number T1 generated by the node, with a key shared by the node and the server; and sends the encrypted data and the node identification to the server through the gateway. The decrypting unit 303 decrypts data encrypted by the server and forwarded by the gateway with the key, determines that the server is a valid server according to a T1-related number obtained by decryption, and establishes a security channel with the gateway according to a new key obtained through the decryption. By doing so, without increasing the times of information interaction between the gateway and the server, the server can authenticate the node during mutual authentication of the gateway and the node, thereby lowering security destructive power even if the gateway would be hacked and controlled by hackers, and improving security.

Embodiment 4

Figure 4:
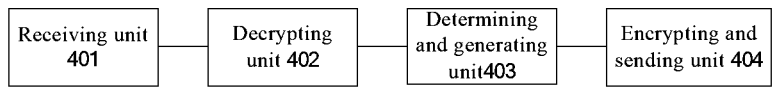
FIG. 4 is a basic block view of a server according to an embodiment of this invention.

Referring to FIG. 4, a server is provided in an embodiment of this invention, comprising:

a receiving unit 401, for receiving data encrypted by a node and a node identification which are forwarded through a gateway; the server receives a request for the node to join the network, sent from the gateway, and acquires a node identification ID1 and data encrypted by the node from the request;

a decrypting unit 402 for determining a key shared by the node and the server according to the node identification, and decrypting the data encrypted by the node with the key; the server retrieves a key K1 shared by the node and the server according to ID1, and decrypts the data encrypted by the node with K1;

a determining and generating unit 403 for determining that the node is a valid node according to a number T3 shared by the server and the gateway and a gateway identification obtained through the decryption; deriving T1 through decryption and generating a new key; the server determines whether a authentic gateway identification ID2 and the T3 shared by the gateway and the server can be obtained from the decrypted data, and if so, obtains a random number T1 generated by the node from the decrypted data, generate a key K2, and encrypt K2 and T1+1 with K1; if the decrypted data indicates that end-to-end confidentiality and/or integrity protection is required, a random number T2 generated by the platform will be contained in the content to be encrypted, or if the platform checks a security strategy by which it is determined that end-to-end confidentiality and/or integrity protection is required, T2 and an indication of requiring end-to-end confidentiality and/or integrity protection will be contained in the content to be encrypted;

an encrypting and sending unit 404 for encrypting the new key and a T1-related number with the key shared by the node and the server, and sending the encrypted data to the node through the gateway; the server returns an acknowledgment representing that the node can join the network, wherein the data and K2 encrypted by the server are contained in the acknowledgment.

The encrypting and sending unit 404 is further used to, if it is determined that an indication of requiring end-to-end confidentiality and/or integrity protection is contained in the decrypted data, include a random number T2 generated by the server in the content to be encrypted; or if it is determined that end-to-end confidentiality and/or integrity protection is required through a security strategy check, include a random number T2 generated by the server in the content to be encrypted.

Embodiment 4 employs the receiving unit 401 to receive data encrypted by a node and a node identification which are forwarded through a gateway. The decrypting unit 402 determines a key shared by the node and the server according to the node identification, and decrypts the data encrypted by the node with the key. The determining and generating unit 403 determines that the node is a valid node according to a number T3 shared by the server and the gateway and a gateway identification obtained through the decryption, acquires T1 through decryption and generate a new key. The encrypting and sending unit 404 encrypts the new key and a T1-related number with the key shared by the node and the server, and sends the encrypted data to the node through the gateway. By doing so, without increasing the times of information interaction between the gateway and the server, the server can authenticate the node during mutual authentication of the gateway and the node, thereby lowering security destructive power even if the gateway would be hacked and controlled by hackers, and improving security.

Embodiment 5

Figure 5:
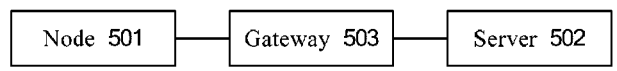
FIG. 5 is a basic block view of a system for authenticating gateway, node and server according to an embodiment of this invention.

Referring to FIG. 5, a system for authenticating gateway, node and server is provided in an embodiment of this invention, comprising:

a node 501, for receiving information sent by a gateway, the information comprising a number T3 shared by the gateway and a server, and a gateway identification; encrypting data to be encrypted, including T3, the gateway identification, and a random number T1 generated by the node, with a key K1 shared by the node and the server, and then sending the encrypted data and a node identification to the server through the gateway; decrypting data encrypted by the server and forwarded through the gateway with the key, determining that the server is a valid server according to a T1-related number obtained by decryption, such as T1+1, and establishing a security channel with the gateway according to a new key obtained through the decryption. Reference can be made to Embodiment 1 for detailed process, which is not described in detail herein;

a server 502, for receiving data encrypted by a node and a node identification which are forwarded through the gateway; determining a key shared by the node and the server according to the node identification, and decrypting the data encrypted by the node with the key; determining that the node is a valid node according to a number T3 shared by the server and the gateway, and a gateway identification obtained through the decryption, deriving T1 by decryption; and generating a new key; encrypting the new key and a T1-related number with the key shared by the node and the server, and sending the encrypted data to the node through the gateway. Reference can be made to Embodiment 2 for detailed implementation of the process of the server, which is not described in detail herein.

The system further comprises a gateway 503 for sending a message to the node, the message comprising the number T3 shared by the gateway and the server and a gateway identification, receiving and forwarding encrypted data sent by the node, and receiving and forwarding data encrypted by the server.

Embodiment 5 employs the node to encrypt data to be encrypted, including T3, a gateway identification, and a random number T1 generated by the node, with a key shared by the node and the server, and then send the encrypted data and a node identification to the server through the gateway; the server determines a key shared by the node and the server according to the node identification, and decrypts the data encrypted by the node with the key; the server determines that the node is a valid node according to a number T3 shared by the server and the gateway and a gateway identification obtained through the decryption, derives T1 by decryption, and generates a new key; the node decrypts the data encrypted by the server and forwarded through the gateway with the key, determines that the server is a valid server according to a T1-related number obtained through the decryption, and establishes a security channel with the gateway with a new key obtained through the decryption. By doing so, without increasing the times of information interaction between the gateway and the server, the server can authenticate the node during mutual authentication of the gateway and the node, thereby lowering security destructive power even if the gate way would be hacked and controlled by hackers, and improving security.

Embodiment 6

Figure 6:
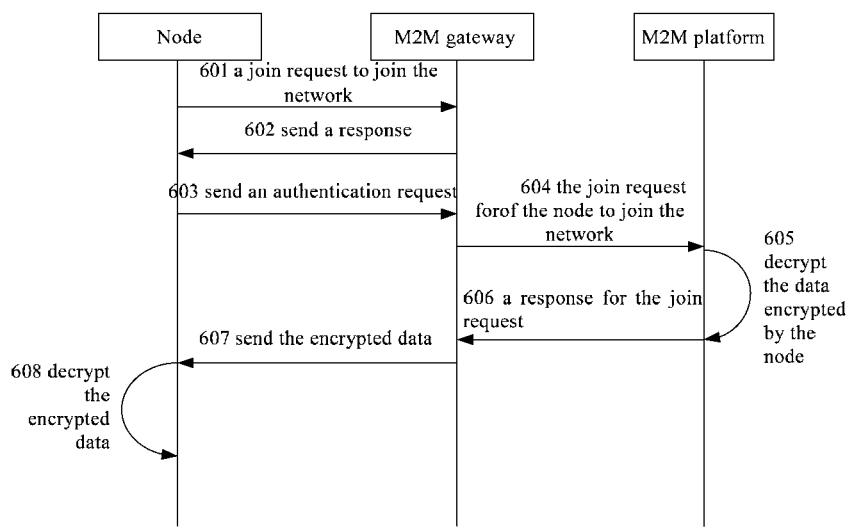
FIG. 6 is a flowchart of a particular implementation of a method for authenticating gateway, node and server according to an embodiment of this invention.

Referring to FIG. 6, a detailed implementation of a method for authenticating gateway, node and server is provided in an embodiment of this invention. The network comprises particularly a M2M gateway, a M2M platform and a node. The method comprises the following steps.

601. The node sends a request to join the network to the M2M gateway.

Herein, the request can be sent to the M2M gateway through broadcast.

602. The M2M gateway sends a response to the node, indicating that authentication is required for joining the network, and sends a number 11111 shared by the gateway and the platform to the node, along with an identification "gateway1" of the gateway. The number 11111 is randomly generated during the establishment of a security session by the M2M platform, and will be increased by one at each interaction between the gateway and the platform.

603. The node sends an authentication request to the M2M gateway.

The authentication request comprises gateway1, 11111, and a number 12345 randomly generated by the node, which are encrypted with a key K1 shared by the node and the platform, as well as a node identification "node1" sent in plaintext.

Optionally, if the node has applied a security strategy according to gateway1, by which it is determined that end-to-end confidentiality and/or integrity protection is required for application data, an indication "need" of requiring end-to-end confidentiality and/or integrity protection can be added in the encrypted data.

604. The M2M gateway sends the request for the node to join the network to the M2M platform.

The request comprises data encrypted by the node at step 603 and the node identification node1.

605. The M2M platform decrypts the data encrypted by the node.

The M2M platform retrieves K1 according to node1, decrypts the data encrypted by the node with K1, determines that the node is a valid node without security problems, according to the obtained gateway identification gateway1 and the number 11111 shared by the gateway, and the authentication is passed. Further, the M2M platform acquires, from the decrypted data, 12346 which is the result of the random number 12345 generated by the node increased by one, and then generates a key K2 and encrypts K2 and 12346 with K1.

Optionally, if the decrypted data indicates that end-to-end confidentiality and/or integrity protection is required, a random number 22222 generated by the platform will be contained in the content to be encrypted.

606. The M2M platform returns a response to the request to the M2M gateway.

The response to the request indicates that the node is allowed to join the network, in which K2 and 12346 encrypted with K1 are contained, in addition to a separate K2. The M2M platform increases the number 11111 shared with the gateway by one to get 11112.

607. The M2M gateway sends the data encrypted by the M2M platform to the node.

The M2M gateway receives the response, retrieves K2, increases the number 11111 shared with the gateway by one to get 11112, and includes the encrypted data encrypted by the M2M platform in a response to the authentication request to send to the node.

608. The node decrypts the data encrypted by the M2M platform.

The node receives the authentication response, decrypts data with K1 to obtain K2 and the number 12346, determines that the identity of the gateway is authentic without security problems according to 12346, and then negotiates a security channel with the gateway using K2 for subsequent information interaction.

Optionally, a key K3 required for end-to-end confidentiality and/or integrity protection is further generated based on 22222 according to the same rule as that of the M2M platform.

This invention can complete node authentication by the server during the mutual authentication of the gateway and the node, without increasing the times of information interaction between the gateway and the server, so that security destructive power can be lowered even if the gate way would be hacked and controlled by hackers and security can be improved.

Embodiment 7

Figure 7:
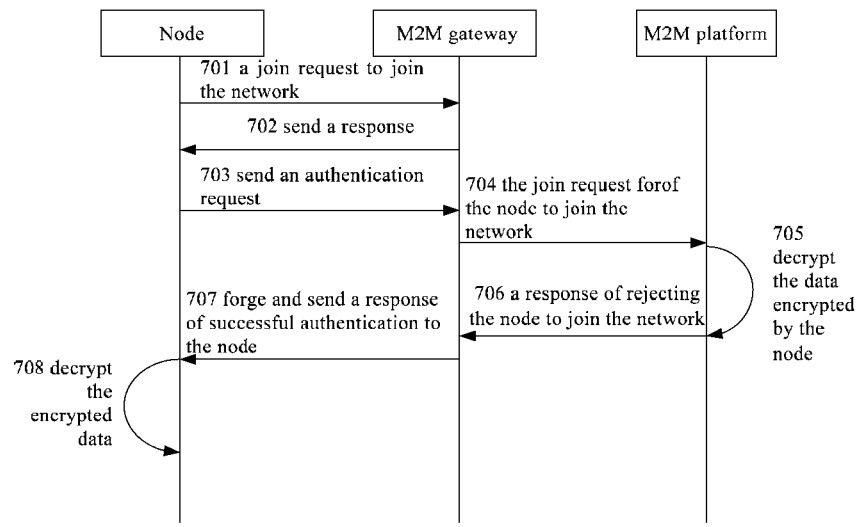
FIG. 7 is a flowchart of another particular implementation of the method for authenticating gateway, node and server according to an embodiment of this invention.

Referring to FIG. 7, a detailed implementation of the method for authenticating gateway, node and server is provided in an embodiment of this invention. The network comprises particularly a M2M gateway, a M2M platform and a node. Assuming that the gateway is attacked by a hacker, who has forged a gateway identification, the particular process is as follows.

701. The node sends a request to join the network to the M2M gateway.

Here, the request can be sent to the M2M gateway through broadcast.

702. The M2M gateway sends a response to the node, indicating that authentication is required for joining the network, and sends a number 11111 shared by the gateway and the M2M platform to the node, along with a forged identification "gateway2" of the gateway, while the authentic identification of the gateway is "gateway1". 11111 is randomly generated during the establishment of a security session by the server, and will be increased by one at each interaction between the gate and the platform.

703. The node sends an authentication request to the M2M gateway.

The authentication request comprises gateway2, 11111, and a random number 12345 generated by the node, which are encrypted with a key K1 shared by the node and the platform, as well as a node identification "node1" sent in plaintext.

704. The M2M gateway sends the request for the node to join the network to the M2M platform.

The request comprises data encrypted by the node at step 703 and the node identification node1.

705. The M2M platform decrypts the data encrypted by the node.

The M2M platform retrieves K1 according to node1, decrypts the data encrypted by the node with K1 to get the gateway identification gateway2 and the number 11111 shared by the gateway and the platform, and determines that the gateway identification obtained through the decryption is not identical to the authentic gateway identification The authentication fails.

706. The M2M platform returns a response of rejecting the node to join the network to the M2M gateway.

707. The M2M gateway receives the response, and forges a response of successful authentication to send to the node.

708. The node decrypts data encrypted by the M2M platform.

The node receives the authentication response, decrypts the data with K1. Because the encrypted data in the authentication response is forged by the M2M gateway, the number 12346 resulted from adding one to the random number 12345 generated by the node at step 3 cannot be obtained from the data decrypted by the node, and thus the node determines that the authentication response is invalid. The joining to the network fails.

This invention can effectively prevent a gateway from forging its own identification, so that a node can apply a security strategy configured on the node according to the identification of the gateway, thereby avoiding security problems.

Embodiment 8

Figure 8:
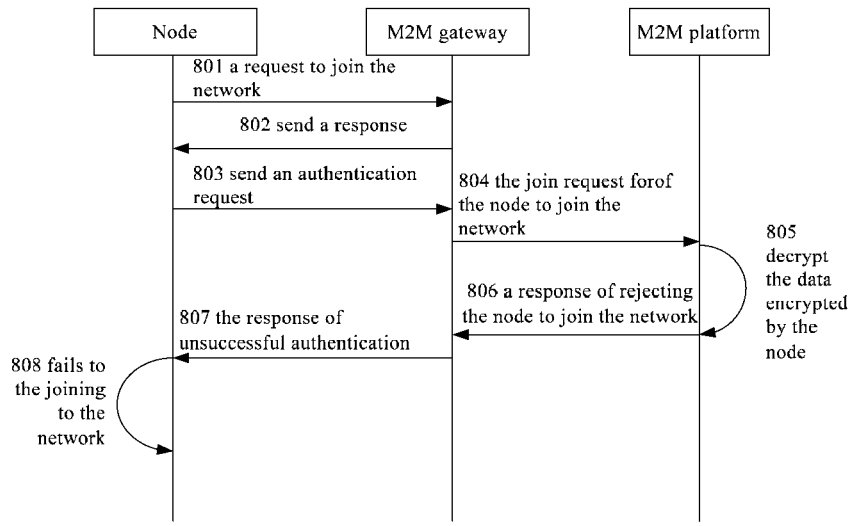
FIG. 8 is a flowchart of another particular implementation of the method for authenticating gateway, node and server according to an embodiment of this invention.

Referring to FIG. 8, a flowchart of another detailed implementation of the method for authenticating gateway, node and server is provided in an embodiment of this invention. The network comprises particularly a M2M gateway, a M2M platform and a node. Assuming that the node is a forged node, the detailed process is as follows.

801. The node sends a request to join the network to the M2M gateway.

Here, the request can be sent to the M2M gateway through broadcast.

802. The M2M gateway sends a response to the node, indicating that authentication is required for joining the network, and sends a number 11111 shared by the gateway and the M2M platform to the node, along with an identification "gateway1" of the gateway. 11111 is randomly generated during the establishment of a security session by the server, and will be increased by one at each interaction between the gate and the platform.

803. The node sends an authentication request to the M2M gateway.

The authentication request comprises gateway1, 11111, and a random number 12345 generated by the node, which are encrypted with a key K1 shared by the node and the platform, as well as a forged node identification "node2", while the authentic node identification is "node1".

804. The M2M gateway sends the request for the node to join the network to the M2M platform.

The request comprises the data encrypted by the node at step 803 and the node identification node2. In the case that the gateway pretends to be a node to join the network, the three steps above do not exist, and the gateway needs to forge the data which should have been encrypted by the node.

805. The M2M platform decrypts the data encrypted by the node.

The M2M platform retrieves a key K3 shared by the M2M platform and the node node2 according to node2, decrypts the data encrypted by the node with K3, from which authentic gateway identification gateway1 and the number 11111 shared by the gateway and the platform cannot be obtained, leading to failed authentication.

806. The M2M platform returns a response of rejecting the node to join the network to the M2M gateway. In the case that the gateway pretends to be a node to join the network, the process ends at this point.

807. The M2M gateway receives the response, and returns a response of unsuccessful authentication to the node.

808. The node receives the response of unsuccessful authentication, and fails to the join to the network.

This invention can effectively prevent a forged node or a gateway pretending to be a node from joining the network, and security problems that otherwise may arise can be avoided.

From the above description of embodiments of this invention, those skilled in the art can understand that some or all steps of the method of the above described embodiments can be realized with programs to instruct related hardware, and the programs can be stored in a computer readable storage medium, such as ROM/RAM, magnetic disc, optical disc, and etc., which, when being executed, include the steps of the method of the embodiments.

The description above is merely detailed implementations of this invention, and the scope of this invention is not limited thereto. Any those skilled in the art can easily conceive modifications or alternations within the technical scope disclosed in this invention, which should be covered in the scope of this invention. Thus, the scope of this invention should coincide with the scope of the appended claims.

What is claimed is:

1. A method for authenticating a gateway, a node and a server, comprising:
   receiving, by the node, a request message from the gateway, the request message comprising a number T3 shared by the gateway and the server, and a gateway identification;
   encrypting, by the node with a key K1 shared by the node and the server, first data to be encrypted, including the number T3, the gateway identification, an indication of requiring one of the group consisting of (a) end-to-end confidentiality and (b) integrity protection and a random number T1 generated by the node, and sending the encrypted first data and a node identification to the server through the gateway;
   decrypting second data, by the node, with the key K1, wherein the second data is data encrypted by the server and forwarded to the node by the gateway, determining, by the node, that the server is a valid server according to a T1-related number obtained by the decryption, and establishing a security channel with the gateway according to a new key K2 obtained through the decryption;
   generating, by the node, a key K3 which is required by the one of the group consisting of (a) end-to-end confidentiality and (b) integrity protection according to a random number T2 obtained through the decryption, wherein the random number T2 is generated by the server based on the indication of requiring one of the group consisting of (a) end-to-end confidentially and (b) integrity protection in the encrypted first data.

2. The method according to claim 1, further comprising:
   determining, by the node, that the gateway has applied a security strategy according to the gateway identification, and in response thereto, adding the indication of requiring one of the group consisting of (a) end-to-end confidentiality and (b) integrity protection into the first data to be encrypted.

3. A method for authenticating a gateway, a node and a server, comprising:
- receiving, by the server, first data encrypted by the node and a node identification which are forwarded through the gateway;
- determining, by the server, a key shared by the node and the server according to the node identification, and decrypting the first data encrypted by the node with the key;
- determining, by the server, that the node is a valid node according to a number T3 shared by the server and the gateway, and a gateway identification obtained through the decryption, and generating a new key; and
- generating a random number T2 based on an indication of requiring one of the group consisting of (a) end-to-end confidentiality and (b) integrity protection in the first data, encrypting, by the server, second data the second data comprising the new key, the random number T2 and a T1-related number, with the key shared by the node and the server, and sending the encrypted second data to the node through the gateway such that the node is able to generate a key required for the one of the group consisting of (a) end-to-end confidentiality and (b) the integrity protection according to the random number T2.

4. A system for authenticating a gateway, a node and a server, comprising:
- the node, configured to:
  - receive a request message sent by the gateway, the message comprising a number T3 shared by the gateway and the server, and a gateway identification;
  - encrypt first data with a key K1 shared by the node and the server, the first data including the number T3, the gateway identification, an indication of requiring one of the group consisting of (a confidentiality and (b) integrity protection, and a random number T1 generated by the node;
  - send the encrypted first data and a node identification to the server through the gateway;
  - decrypt second data encrypted by the server and forwarded through the gateway with the key K1;
  - determine that the server is a valid server according to a T1-related number T1+1 obtained by the decryption, and
  - establish a security channel with the gateway according to a new key K2 obtained through the decryption;
  - generate a key K3 which is required by the one of the group consisting of (a) end-to-end confidentiality and (b) integrity protection according to a random number T2 obtained through the decryption, wherein the random number T2 is generated by the server based on the indication of requiring one of the group consisting of (a) end-to-end confidentiality and (b) integrity protection in the encrypted first data;
- the server, configured to:
  - receive the first data encrypted by the node and the node identification which are forwarded through the gateway;
  - determine the key K1 shared by the node and the server according to the node identification;
  - decrypt the first data encrypted by the node with the key K1;
  - determine that the node is a valid node according to a number T3 shared by the server and the gateway, and the gateway identification obtained through the decryption;
  - generate the new key K2;
  - generate the random number T2 according to the indication of requiring one of the group consisting of (a) end-to-end confidentiality and (b) integrity protection in the first data;
  - encrypt the second data with the key K1 shared by the node and the server, the second data comprising the new key K2, the random number T2 and the T1-related number T1+1; and
  - send the encrypted data to the node through the gateway;
- the gateway, configured to:
  - send the request message to the node;
  - receive and forward the encrypted first data sent by the node; and
  - receive and forward the second data encrypted by the server.

5. A node, comprising a non-transitory computer-readable medium having instructions thereon for authentication, the computer-executable instructions, when executed by a processor, causing the following steps to be performed:
- receiving a request message from a gateway, the request message comprising a number T3 shared by the gateway and a server, and a gateway identification;
- encrypting, with a key K1 shared by the node and the server, first data to be encrypted, including T3, the gateway identification, an indication of requiring one of the group consisting of (a) end-to-end confidentiality and (b) integrity protection, and a random number T1 generated by the node;
- sending the encrypted first data and a node identification to the server through the gateway;
- decrypting second data, by the node, with the key K1, wherein the second data is data encrypted by the server and forwarded to the node by the gateway;
- determining that the server is a valid server according to a T1-related number obtained by the decryption; and
- establishing a security channel with the gateway according to a new key K2 obtained through the decryption;
- generating a key K3 which is required by the one of the group consisting of (a) end-to-end confidentiality and (b) integrity protection according to a random number T2 obtained through the decryption, wherein the random number T2 is generated by the server based on the indication of requiring one of the group consisting of (a) end-to-end confidentiality and (b) integrity protection in the encrypted first data.

6. The node according to claim 5, wherein the steps further comprise:
- determining that the gateway has applied a security strategy according to the gateway identification, and in response thereto, adding the indication of requiring one of the group consisting of (a) end-to-end confidentiality and (b) integrity protection into the first data to be encrypted.

7. A server, comprising a non-transitory computer-readable medium having instructions thereon for authentication, the computer-executable instructions, when executed by a processor, causing the following steps to be performed:
- receiving first data encrypted by a node and a node identification which are forwarded through a gateway;
- determining a key shared by the node and the server according to the node identification, and decrypting the first data encrypted by the node with the key;
- determining, by the server, that the node is a valid node according to a number T3 shared by the server and the gateway, and a gateway identification obtained through the decryption, and generating a new key; and generating a random number T2 according to an indication of requiring one of the group consisting of (a) end-to-end confidentiality and (b) integrity protection in the first data;

encrypting, by the server, second data, the second data comprising the new key, the random number T2 and a T1-related number, with the key shared by the node and the server; and sending the encrypted second data to the node through the gateway such that the node is able to generate a key required for the one of the group consisting of (a) end-to-end confidentiality and (b) the integrity protection according to T2.

* * * * *

UNITED STATES PATENT AND TRADEMARK OFFICE
CERTIFICATE OF CORRECTION

PATENT NO. : 8,639,929 B2  
APPLICATION NO. : 13/729576  
DATED : January 28, 2014  
INVENTOR(S) : Bian et al.

Page 1 of 1

It is certified that error appears in the above-identified patent and that said Letters Patent is hereby corrected as shown below:

Title page, item (71), Applicant's City of Residence "Guangdong (CN)" should read -- Shenzhen (CN) --.

In the Claims:

Column 12, Claim 1, line 46 "decrypting second data" should read

-- decrypting the second data --.

Column 12, Claim 1, line 59 "end-to-end confidentially" should read

-- end-to-end confidentiality --.

Column 13, Claim 4, line 33 "(a confidentiality and" should read

-- (a) end-to-end confidentiality --.

Signed and Sealed this  
Thirteenth Day of May, 2014

Michelle K. Lee  
*Deputy Director of the United States Patent and Trademark Office*